(12) United States Patent
Yasuda (10) Patent No.: US 7,581,102 B2
(45) Date of Patent: Aug. 25, 2009

(54) CERTIFICATE CONFIRMATION METHOD, CERTIFICATE CONFIRMATION PROGRAM AND CERTIFICATE THAT CAN READILY AND MORE POSITIVELY CONFIRM AUTHENTICITY OF CERTIFICATE

(75) Inventor: Hiroshi Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 920 days.

(21) Appl. No.: 11/034,214

(22) Filed: Jan. 13, 2005

(65) Prior Publication Data

US 2005/0160260 A1 Jul. 21, 2005

(30) Foreign Application Priority Data

Jan. 19, 2004 (JP) ............... 2004-010922

(51) Int. Cl.
*H04L 9/32* (2006.01)
*G06F 21/24* (2006.01)

(52) U.S. Cl. .................. 713/175; 713/179; 708/203

(58) Field of Classification Search ............. None
See application file for complete search history.

(56) References Cited

U.S. PATENT DOCUMENTS

| | | | | |
|---|---|---|---|---|
| 5,768,382 A * | 6/1998 | Schneier et al. | ........... | 380/251 |
| 5,970,143 A * | 10/1999 | Schneier et al. | ........... | 713/181 |
| 6,823,075 B2 * | 11/2004 | Perry | ........... | 382/100 |
| 7,080,041 B2 * | 7/2006 | Nagel | ........... | 705/51 |
| 7,089,420 B1 * | 8/2006 | Durst et al. | ........... | 713/176 |
| 7,152,047 B1 * | 12/2006 | Nagel | ........... | 705/76 |
| 7,178,030 B2 * | 2/2007 | Scheidt et al. | ........... | 713/176 |
| 7,362,862 B2 * | 4/2008 | Schneier et al. | ........... | 380/251 |
| 7,373,506 B2 * | 5/2008 | Asano et al. | ........... | 713/168 |
| 2002/0012445 A1 * | 1/2002 | Perry | ........... | 382/100 |
| 2002/0138771 A1 * | 9/2002 | Dutta | ........... | 713/202 |
| 2003/0147548 A1 * | 8/2003 | Ruhl et al. | ........... | 382/100 |
| 2004/0153649 A1 * | 8/2004 | Rhoads et al. | ........... | 713/176 |
| 2006/0161779 A1 * | 7/2006 | Geoffrey | ........... | 713/176 |

FOREIGN PATENT DOCUMENTS

| | | |
|---|---|---|
| JP | 2002-200872 | 7/2002 |
| JP | 2004-280603 | 10/2004 |

* cited by examiner

*Primary Examiner*—Christopher A Revak
(74) *Attorney, Agent, or Firm*—Morrison & Foerster LLP (57) ABSTRACT

A method of confirming a certificate by using a management computer that issues the certificate is disclosed. The management computer is coupled to an application terminal for applying for issuance of the certificate and to a confirmation terminal for reading a display code printed on the certificate. The management computer performs the steps of: specifying contents to be certified based on an application item received from the application terminal; issuing the certificate by calculating a compressed value by substituting data related to the contents to be certified into a one-way function, and by generating print data for printing a display code including the compressed value and the contents to be certified; recording an issuance history of the certificate; and when data of a compressed value are received from the confirmation terminal that reads the display code on the certificate, notifying the confirmation terminal of authenticity of the certificate based on a result of comparison between the received compressed value and the compressed value calculated in the step of issuing the certificate.

17 Claims, 6 Drawing Sheets

FISCAL YEAR 2003 TAXATION CERTIFICATE OF CITY TAX AND PREFECTURAL INHABITANT TAX

| AS OF 01/01/2003 | ADDRESS | 6-14-6 GINZA CHUO-KU TOKYO |
|---|---|---|
| | NAME | TARO RICOH |

| TOTAL INCOME DURING 2002 | AMOUNT OF SALARY PAID DURING 2002 |
|---|---|
| ¥10,000,000 | ¥12,000,000 |

AMOUNT OF TAX (FISCAL YEAR 2003)

| | PER INCOME LEVY | PER CAPITA BASIS | TOTAL | ANNUAL TAXATION |
|---|---|---|---|---|
| CITY TAX | ¥580,000 | ¥3,000 | ¥583,000 | ¥759,500 |
| PREFECTURAL INHABITATION TAX | ¥175,000 | ¥1,500 | ¥176,500 | |

(NOTE)
I HEREBY CERTIFY THAT ABOVE STATEMENT IS TRUE AND CORRECT.

DECEMBER 25, 2003

MR. X, MAYOR    SEAL

FLOWER OF CITY

101

ORIGINAL CERTIFICATION CODE

CERTIFICATE CONFIRMATION METHOD, CERTIFICATE CONFIRMATION PROGRAM AND CERTIFICATE THAT CAN READILY AND MORE POSITIVELY CONFIRM AUTHENTICITY OF CERTIFICATE

BACKGROUND OF THE INVENTION

1. Field of the Invention

The present invention generally relates to certificate confirmation methods and certificate confirmation programs for confirming certificates issued by, for example, specific organizations and to the certificates.

2. Description of the Related Art

Generally, in many cases, whether a certain certificate is authentic is determined based on a seal impression on the certificate. However, in the case where such a certification seal is affixed, the place of issue of certificates is limited. For this reason, in some cases, a digitized seal image is used as a certification seal.

On the other hand, with the recent development in image-related techniques, the quality of images of copying machines has been improved. Hence, it is difficult to simply distinguish between the originals of securities and certificates and copies of them. Further, with the development in digital processing techniques, it has become easy to modify documents and images to be printed. Thus, there is a high probability that securities and certificates are readily forged.

Therefore, various techniques have been invented in order to prevent forgery of securities and certificates (for example, refer to Japanese Laid-Open Patent Application No. 2002-200872). In Japanese Laid-Open Patent Application No. 2002-200872, minute boreholes that are difficult to be visually observed are formed in a base material with different shapes and arranging directions.

Meanwhile, in order to readily provide, for example, tickets, convenient stores print and sell the tickets in some cases. However, in the case where minute boreholes that are difficult to be visually observed are formed as in the techniques disclosed in Japanese Laid-Open Patent Application No. 2002-200872, a special printing apparatus is required. In addition, it is also possible to print tickets on special paper with watermark. However, also in this case, special paper is required.

On the other hand, in some cases, a customer who has received a certificate may be anxious about whether the certificate is real. For example, when a customer has purchased a ticket from an agency other than the ticket-issuing agency, it is difficult or impossible for the customer to readily confirm whether the ticket is authentic.

SUMMARY OF THE INVENTION

A general object of the present invention is to provide an improved and useful certificate confirmation method, certificate confirmation program, and certificate in which one or more of the above-mentioned problems are eliminated.

Another and more specific object of the present invention is to provide a certificate confirmation method, a certificate confirmation program, and a certificate with which a customer can readily and positively confirm whether the certificate is authentic in the case where the certificate is printed at a location other than an organization that issues the certificate.

In order to achieve the above-mentioned objects, according to one aspect of the present invention, there is provided a method of confirming a certificate by using a management computer that issues the certificate, the management computer being coupled to an application terminal for applying for issuance of the certificate and to a confirmation terminal for reading a display code printed on the certificate, wherein the management computer performing the steps of:

specifying contents to be certified based on an application item received from the application terminal;

issuing the certificate by calculating a compressed value by substituting data related to the contents to be certified into a one-way function, and by generating print data for printing a display code including the compressed value and the contents to be certified;

recording an issuance history of the certificate; and when data of a compressed value are received from the confirmation terminal that reads the display code on the certificate, notifying the confirmation terminal of authenticity of the certificate based on a result of comparison between the received compressed value and the compressed value calculated in the step of issuing the certificate.

In an embodiment of the present invention, the management computer specifies the contents to be certified based on one or more application items from the application terminal. The management computer stores a compressed value calculated by substituting data related the contents to be certified into a one-way function, and issues the certificate by printing the display code including the compressed value. The management computer compares a compressed value received from the confirmation terminal that has read the display code on the issued certificate with the stored compressed value. When both compressed values match, the management computer notified the confirmation terminal of authenticity of the certificate. Hence, it is possible for the management computer to determine the authenticity of the certificate based on the compressed value received from the confirmation terminal and to notify the confirmation terminal of the result of determination. Accordingly, a user can readily confirm whether the certificate is authentic.

Additionally, the step of notifying may include:

transmitting, to the confirmation terminal, at least a part of the contents to be certified.

In an embodiment of the present invention, the management computer transmits, to the confirmation terminal, at least a part of the contents certified in the certificate. Hence, it is possible to more positively confirm authenticity of the certificate by comparing the contents received at the confirmation terminal with the contents certified in the certificate to which the display code is attached.

Additionally, the step of issuing may include:

issuing the certificate by printing the display code and the contents to be certified on a print recording medium having a copy-protection pattern that includes at least one of a character and a pattern displayed when the certificate is copied.

In an embodiment of the present invention, the management computer prints the display code and the contents to be certified on a print recording medium having a copy-protection pattern that includes at least one of a character and a pattern displayed when the certificate is copied. Hence, when the certificate is copied, the character and/or pattern appear. Accordingly, the user can readily determine that the certificate is not the original.

Additionally, the step of issuing may include:

issuing the certificate by printing a copy-protection pattern together with the display code and the contents to be certified, the copy-protection pattern including at least one of a character and a pattern displayed when the certificate is copied.

In an embodiment of the present invention, the display code and the contents to be certified are printed together with the copy-protection pattern including at least one of a character and a pattern displayed when the certificate is copied. Hence, even if a special print recording medium is not used, it is possible to issue a certificate on which the character and/or pattern appears when the certificate is copied. Accordingly, the user can readily determine that the certificate is not the original.

Additionally, the terminal may be a mobile phone terminal, and the mobile phone terminal may perform the steps of:

photographing the display code;

obtaining, from the photographed display code, data included in the display code; and receiving, from the management computer that transmits the data obtained in the step of obtaining, data related to authenticity of the certificate and displaying the data related to authenticity.

In an embodiment of the present invention, the confirmation terminal is a mobile phone terminal. Hence, the user can readily confirm authenticity of the certificate with the use of the mobile phone terminal.

Additionally, according to another aspect of the present invention, there is provided a program of confirming a certificate by using a management computer that issues the certificate, the management computer being coupled to an application terminal for applying for issuance of the certificate and to a confirmation terminal for reading a display code printed on the certificate, the program causing the management computer to function as:

specifying means for specifying contents to be certified based on an application item received from the application terminal;

issuing means for issuing the certificate by calculating a compressed value by substituting data related to the contents to be certified into a one-way function, and by generating print data for printing a display code including the compressed value and the contents to be certified;

recording means for recording an issuance history of the certificate; and notifying means for notifying, when data of a compressed value are received from the confirmation terminal that reads the display code on the certificate, the confirmation terminal of authenticity of the certificate based on a result of comparison between the received compressed value and the compressed value calculated by the issuing means.

In an embodiment of the present invention, the management computer specifies the contents to be certified based on one or more application items from the application terminal. The management computer stores a compressed value calculated by substituting data related the contents to be certified into a one-way function, and issues the certificate by printing the display code including the compressed value. The management computer compares a compressed value received from the confirmation terminal that has read the display code on the issued certificate with the stored compressed value. When both compressed values match, the management computer notified the confirmation terminal of authenticity of the certificate. Hence, it is possible for the management computer to determine the authenticity of the certificate based on the compressed value received from the confirmation terminal and to notify the confirmation terminal of the result of determination. Accordingly, a user can readily confirm whether the certificate is authentic.

Additionally, the notifying means may transmit, to the confirmation terminal, at least a part of the contents to be certified.

In an embodiment of the present invention, the management computer transmits, to the confirmation terminal, at least a part of the contents certified in the certificate. Hence, it is possible to more positively confirm authenticity of the certificate by comparing the contents received at the confirmation terminal with the contents certified in the certificate to which the display code is attached.

Additionally, the issuing means may issue the certificate by printing the display code and the contents to be certified on a print recording medium having a copy-protection pattern that includes at least one of a character and a pattern displayed when the certificate is copied.

In an embodiment of the present invention, the management computer prints the display code and the contents to be certified on a print recording medium having a copy-protection pattern that includes at least one of a character and a pattern displayed when the certificate is copied. Hence, when the certificate is copied, the character and/or pattern appear. Accordingly, the user can readily determine that the certificate is not the original.

Additionally, the issuing means may issue the certificate by printing a copy-protection pattern together with the display code and the contents to be certified, the copy-protection pattern including at least one of a character and a pattern displayed when the certificate is copied.

In an embodiment of the present invention, the display code and the contents to be certified are printed together with the copy-protection pattern including at least one of a character and a pattern displayed when the certificate is copied. Hence, even if a special print recording medium is not used, it is possible to issue a certificate on which the character and/or pattern appears when the certificate is copied. Accordingly, the user can readily determine that the certificate is not the original.

Additionally, according to another aspect of the present invention, there is provided a certificate including:

contents to be certified; and a display code including a compressed value calculated by substituting data related to the contents to be certified into a one-way function, wherein the contents to be certified and the display code are printed on the certificate.

In an embodiment of the present invention, the display code including the compressed value calculated by substituting data related to the contents to be certified into a one-way function is printed on the certificate. Hence, it is possible to readily determine authenticity of the certificate based on the display code on the certificate.

According to the present invention, it is possible to print out a certificate at a place other than an organization that issues the certificate. Hence, the user can readily obtain the certificate. Further, in this case, it is possible to readily and more positively determine authenticity of the issued certificate.

Other objects, features and advantages of the present invention will become more apparent from the following detailed description when read in conjunction with the following drawings.

DETAILED DESCRIPTION OF THE PREFERRED EMBODIMENTS

Referring to FIGS. 1 through 7, a description is given of one embodiment of the present invention. In this embodiment, it is assumed that a certificate P is obtained from a public organization such as a city government. Specifically, it is assumed that a user requests for the certificate P via a computer terminal 10 in his/her home, and obtains the certificate P at a convenience store or the like. Further, in this embodiment, a mobile phone terminal 40 is used as a confirmation terminal for confirming whether the certificate P is authentic.

Figure 1:
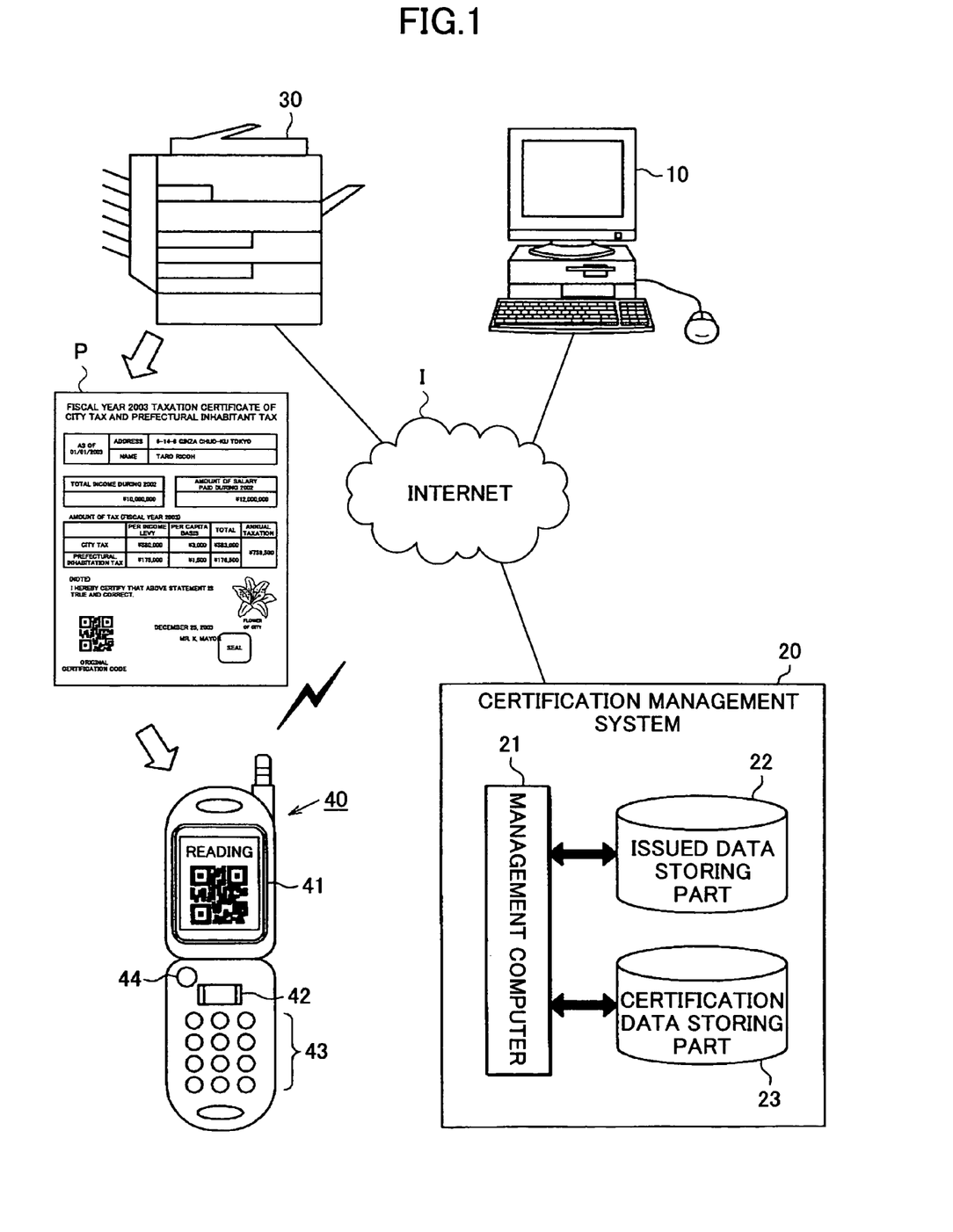
FIG. 1 is a schematic diagram of a system according to one embodiment of the present invention.

As shown in FIG. 1, the computer terminal 10 is installed in the user's home. The computer terminal 10 includes a display, a keyboard and a mouse. An application screen for application of a certificate and an e-mail notifying, for example, the completion of reception are displayed on the display. The keyboard and the mouse are used for inputting necessary information in the application screen. The computer terminal 10 is connected to a certification management system 20 via the Internet I as a network. The certification management system 20 issues the certificate P. The computer terminal 10 is capable of transmitting data to and receiving data from the certification management system 20.

In this embodiment, the city government manages the certification management system 20. The certification management system 20 includes a management computer 21. The management computer 21 includes, for example, a CPU, a RAM and a ROM, which are not shown, and performs the processes (processes including a specifying step, an issuing step, a recording step and a notifying step) described below. By executing a certificate confirmation program for performing the above-mentioned processes, the management computer 21 functions as, for example, specifying means, issuing means, recording means and notifying means.

The management computer 21 is connected to a ledger management system (not shown). The ledger management system manages data regarding addresses and tax payment of users, who are citizens of the government. Hence, the management computer 21 obtains, from the ledger management system, data necessary for creating certificates.

Further, the management computer 21 is connected to an issued data storing part 22 and a certification data storing part 23.

Figure 2:
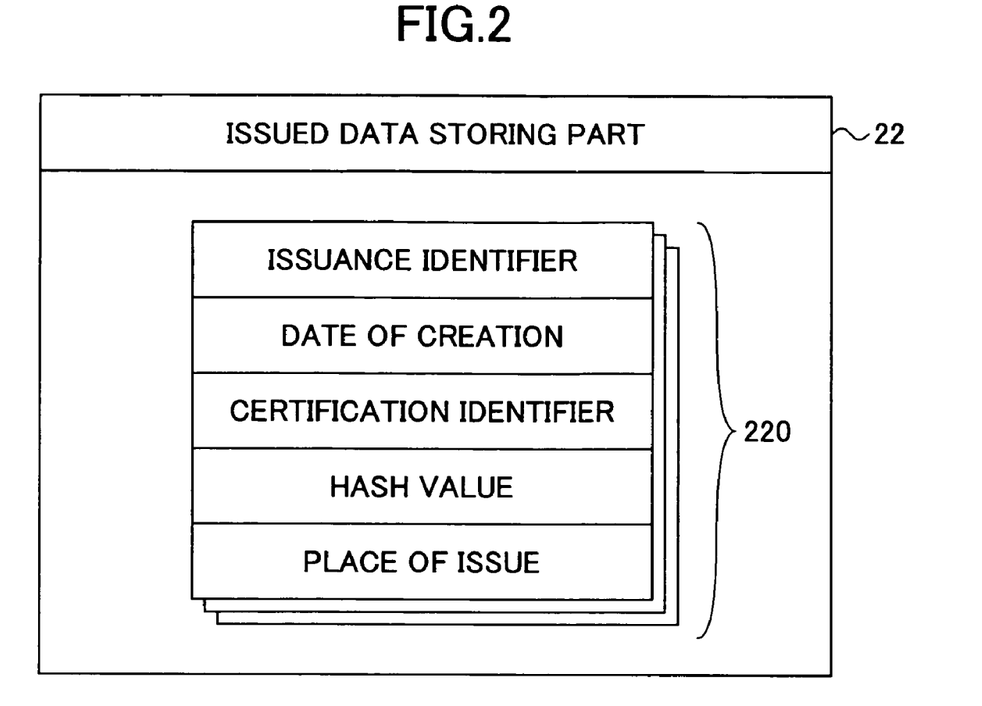
FIG. 2 is a structure diagram of data stored in an issued data storing part.

As shown in FIG. 2, the issued data storing part 22 records therein issued data 220. The issued data 220 are recorded when a certificate is issued in response to an application. The issued data 220 include data related to an issuance identifier, date of creation as issuance history, a certification identifier, a hash value as a compressed value, and a place of issue.

An issuance identifier data area records therein data related to the issuance identifier for specifying a certificate to be issued.

A creation date data area records therein data related to the date of creation of a certificate.

A certification identifier data area records therein data related to the identifier for specifying the contents to be certified.

A hash value data area records therein data related to the hash value generated based on the certified contents are. In this embodiment, specifically, the value is used that is obtained by substituting, into a hash function, certified content data included in certified data 230 that are recorded in the certification data storing part 23, which is described below.

An issued place data area records therein data related to a place where a certificate is issued, that is, a place where the customer receives the certificate.

Figure 3:
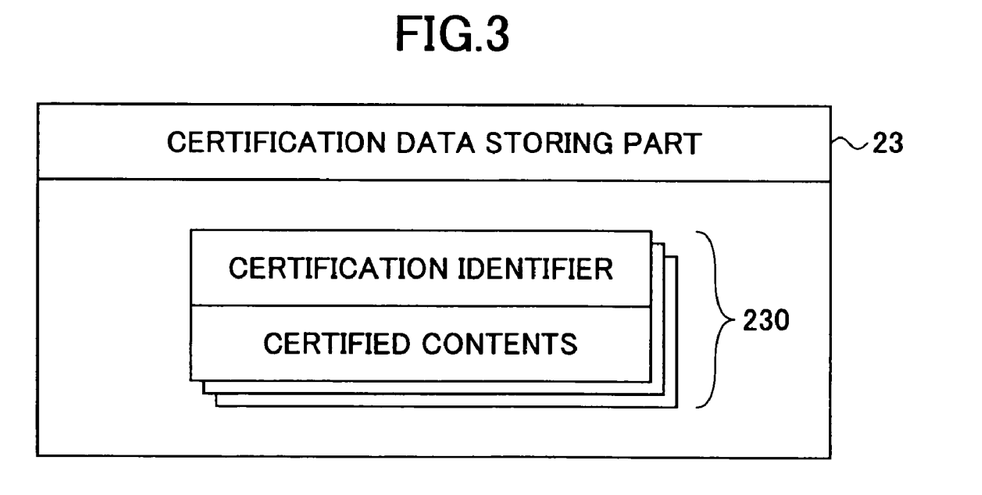
FIG. 3 is a structure diagram of data recorded in a certification data storing part.

As shown in FIG. 3, the certification data storing part 23 records therein the certification data 230 related to the contents of an issued certificate. The certification data 230 are recorded when a certificate having predetermined contents is issued for the first time. The certification data 230 include data related to the certification identifier and the certified contents.

A certification identifier data area records therein data related to an identifier (certification identifier) for specifying the contents to be certified. The issued data 220 and the certified data 230 are associated with each other via the certification identifier.

A certified contents data area records therein data related to the contents of a certificate. For example, in the case where the certificate P is a "taxation certificate", data of the address, name, total income of the year, amount of salary paid, and amount of tax of a tax payer to be certified are recorded.

As shown in FIG. 1, the management computer 21 of the certification management system 20 is coupled to a printer 30 via the Internet I. The printer 30 is installed in, for example, a convenience store or a post office. The printer 30 prints out the certificate P based on data transmitted from the certification management system 20.

The mobile phone terminal 40 used for confirming the authenticity of the certificate P includes, for example, a CPU, a RAM and a ROM, and performs processes (processes including, for example, a photographing step, an obtaining step, and a step of receiving and displaying data related to the authenticity of the certificate P) described below.

In addition, the mobile phone terminal 40 is provided with a display part 41, a selector button 42, number buttons 43, and a function switching button 44. The display part 41 displays, for example, the contents of a notice informing completion of reading of a two-dimensional code and the contents of a certificate.

The selector button 42 includes a pointer moving function and a clicking function. It is possible to move a pointer by directing directions with the use of the selector button 42. It is possible to select the item pointed by the pointer by pressing the selector button 42. Further, characters and the like may be input with respect to the selected item by using the number buttons 43.

The function switching button 44 allows switching among a mail mode, a browser mode, and a two-dimensional code reading mode, in addition to a normal telephone mode. The mail mode is for sending and receiving e-mails. The browser mode is for displaying web pages. The two-dimensional code reading mode is for performing a process of scanning and reading a two-dimensional code. When switching from one mode (e.g., the telephone mode) to another mode (e.g., the two-dimensional code reading mode), the function switching button 44 is used.

Next, a description is given of a certification process using the certificate P. First, referring to FIGS. 4 and 5, a description is given of an issuing process of the certificate P. The issuing process includes an application process and a printing process, and a description of these processes is given in this order.

(Application Process)

First, a user (applicant) connects the computer terminal 10 to the certification management system 20. On this occasion, the certification management system 20 transmits, to the computer terminal 10, application screen data for specifying a certificate to be issued to the computer terminal 10. Based on the received application screen data, the computer terminal 10 displays an application screen on the display.

The application screen includes fields for inputting items necessary for application, for example: the kind of a certificate to be obtained; the contents to be certified; the name of the applicant; and a place to receive the certificate P. The user fills in each of the input fields with an item required for application with the use of the keyboard and/or the mouse. In this embodiment, the case is assumed where a taxation certificate of fiscal year 2003 is applied. Upon completion of the input, the computer terminal 10 transmits, to the certification management system 20, data related to the input items.

Upon reception of the items, the management computer 21 checks whether all of the items required for issuing the certificate P are filled in. When the checking is completed, the management computer 21 obtains, from the ledger management system, data related to the contents of the certificate P to be issued. Specifically, the management computer 21 obtains, from the ledger management system, data related to: the name of a person to be certified, which is received from the computer terminal computer terminal 10; and the total income of fiscal year 2002, amount of salary paid, and amount of tax of the person.

Then, upon reception of the items required for application, the management computer 21 stores, in the issued data storing part 22 and the certification data storing part 23, various kinds of data for issuing the certificate P.

Specifically, the obtained data of the certification contents are stored in the certification data storing part 23. On this occasion, the management computer 21 issues a certification identifier and stores the data of the certification identifier in the certification data storing part 23.

Then, the management computer 21 generates a hash value. The hash value is a compressed value obtained by substituting the data of the certification contents into a hash function, which is a one-way function, to compress the data. The management computer 21 records the generated hash value in the issued data storing part 22. On this occasion, the management computer 21 issues an issuance identifier to the issued data 220 and records the data of the issuance identifier in the issued data storing part 22. Further, the management computer 21 records, in the issued data storing part 22, the date (date of creation) when the data are obtained from the ledger management system and the issued data are created, and data related to a place of issue requested by the user.

Then, the management computer 21 notifies the computer terminal 10 that the application has been accepted. In the notice, the data of the issuance identifier recorded in the issued data storing part 22 are transmitted. The user obtains via the computer terminal 10 the data of the issuance identifier of the certificate P that the user applies. In the aforementioned manner, the application process ends.

(Printing Process)

Figure 4:
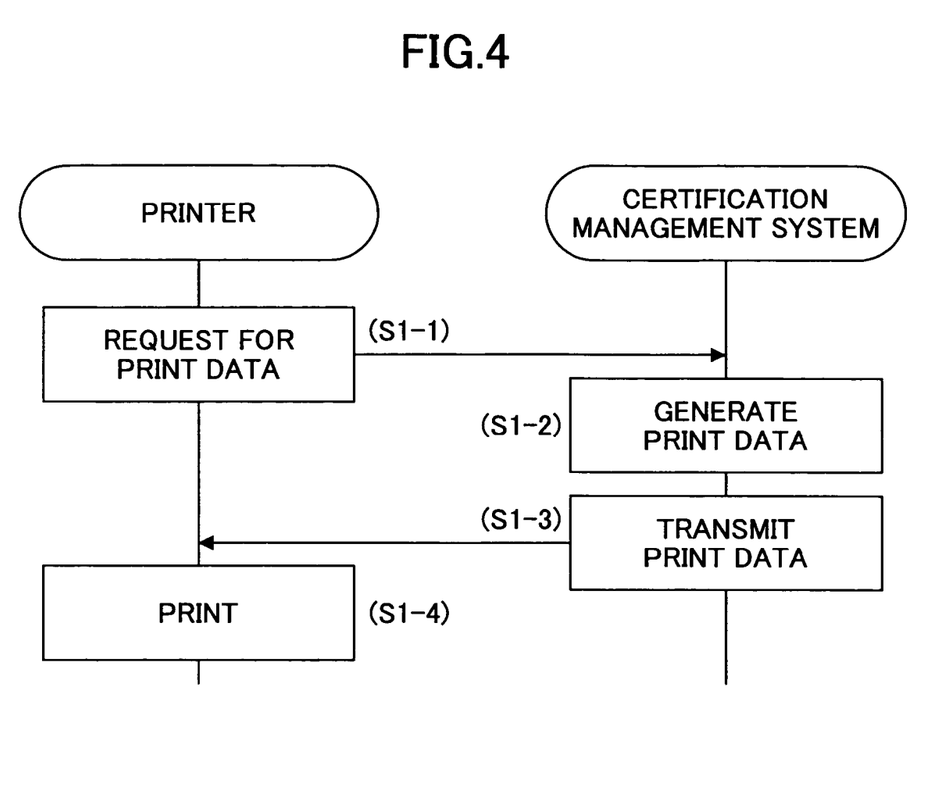
FIG. 4 is a flowchart for explaining the procedure of an issuing process.

Next, referring to FIG. 4, a description is given below of the printing process of the certificate P. Here, the user (applicant) visits the place of issue (in this case, a convenience store) of the certificate P that the user specifies, and receives the issued certificate P.

Specifically, first, in step S1-1, the printer 30 requests the certification management system 20 for print data. On this occasion, the printer 30 transmits, to the certification management system 20, the issuance identifier data that is input by the user.

In step S1-2, the certification management system 20 generates print data. In the generation of the print data, the management computer 21 first generates certification code data. Specifically, the management computer 21 specifies the issued data 220 based on the received issuance identifier. Then, the management computer 21 obtains data related to the issuance identifier, hash value, and date of creation of the specified issued data 220, and data related to the URL (Uniform Resource Locator) of the certification management system 20. Then, the management computer 21 generates the certificate code data including the obtained data. In this embodiment, the certification code is a two-dimensional code.

Then, the management computer 21 generates watermark composite image data. The watermark composite image data includes image data of a "flower" that is a symbol of an office, and a character string of the date of creation.

In step S1-3, the management computer 21 generates and transmits print data to the printer 30. The print data include: data of certified contents; data of the office that certifies the contents; the certification code data; and the watermark composite image data.

Figure 5:
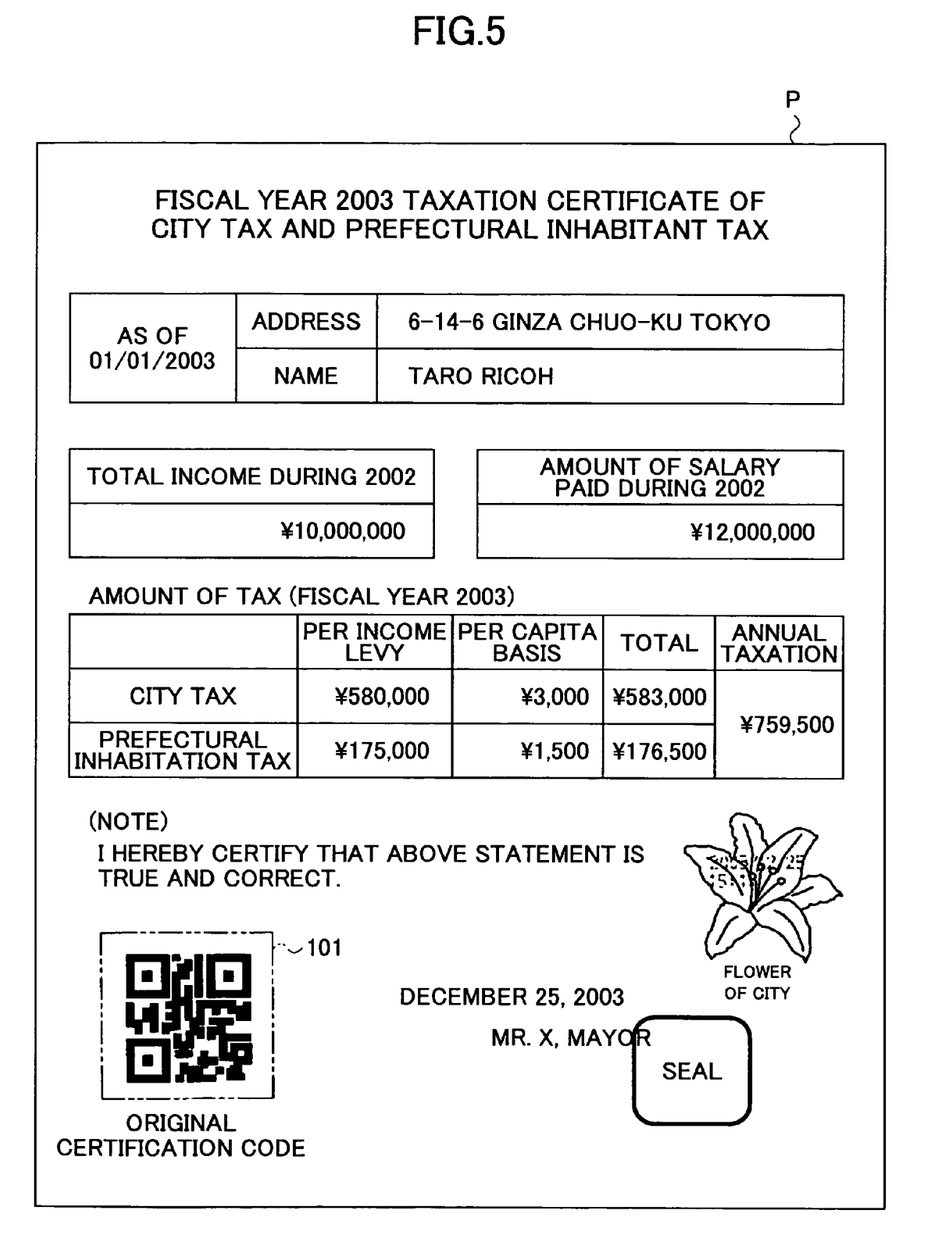
FIG. 5 is a diagram for explaining a certificate.

In step S1-4, upon reception of the print data, the printer 30 prints the certificate P. Consequently, the certificate P shown in, for example, FIG. 5 is printed. The certificate P includes the certified contents, the name of office, a certification code 101 as a display code, and the image of the "flower" incorporating the date of creation. In this embodiment, -printing is performed on paper having a copy-protection watermark as a copy-protection pattern (design). When the paper is copied, the characters "copy" appear. The characters are displayed at the position where the certification code 101 is printed such that the characters overlap the certification code 101. In the aforementioned manner, the printing process ends, and the user (applicant) obtains the certificate P.

(Comparing Process of Certificate P)

Figure 6:
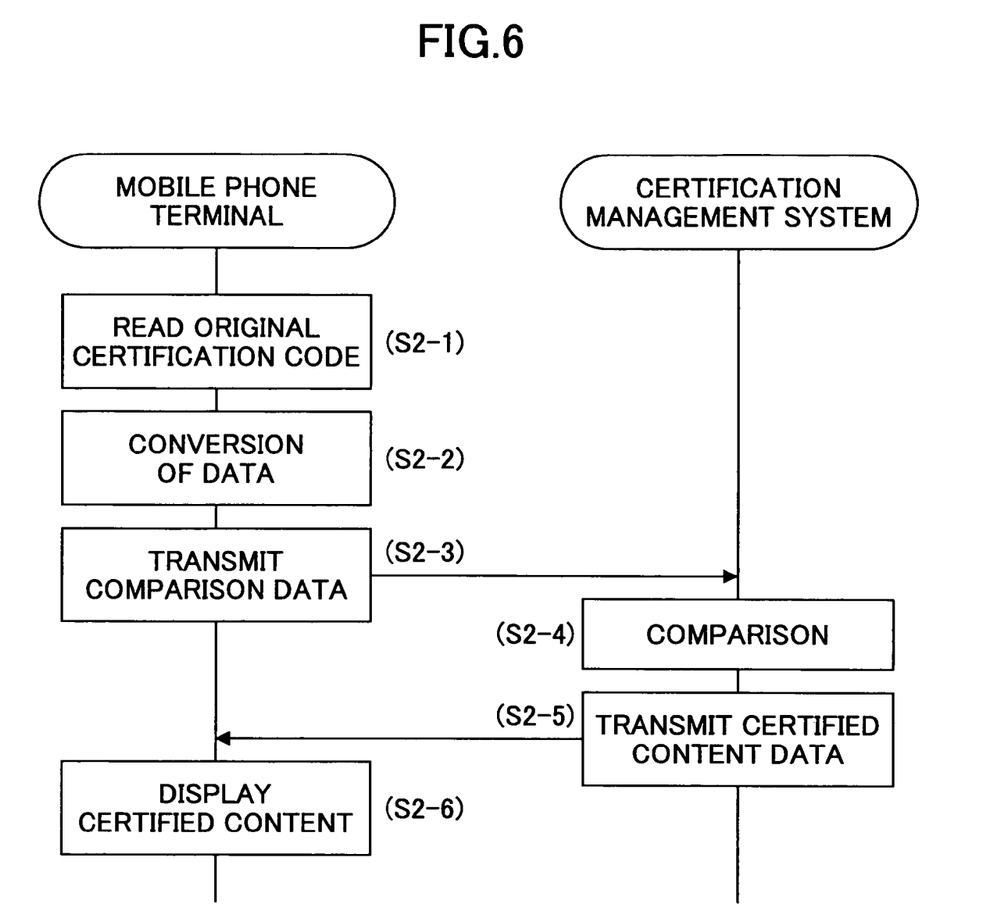
FIG. 6 is a flowchart for explaining the procedure of a comparison process.
Figure 7:
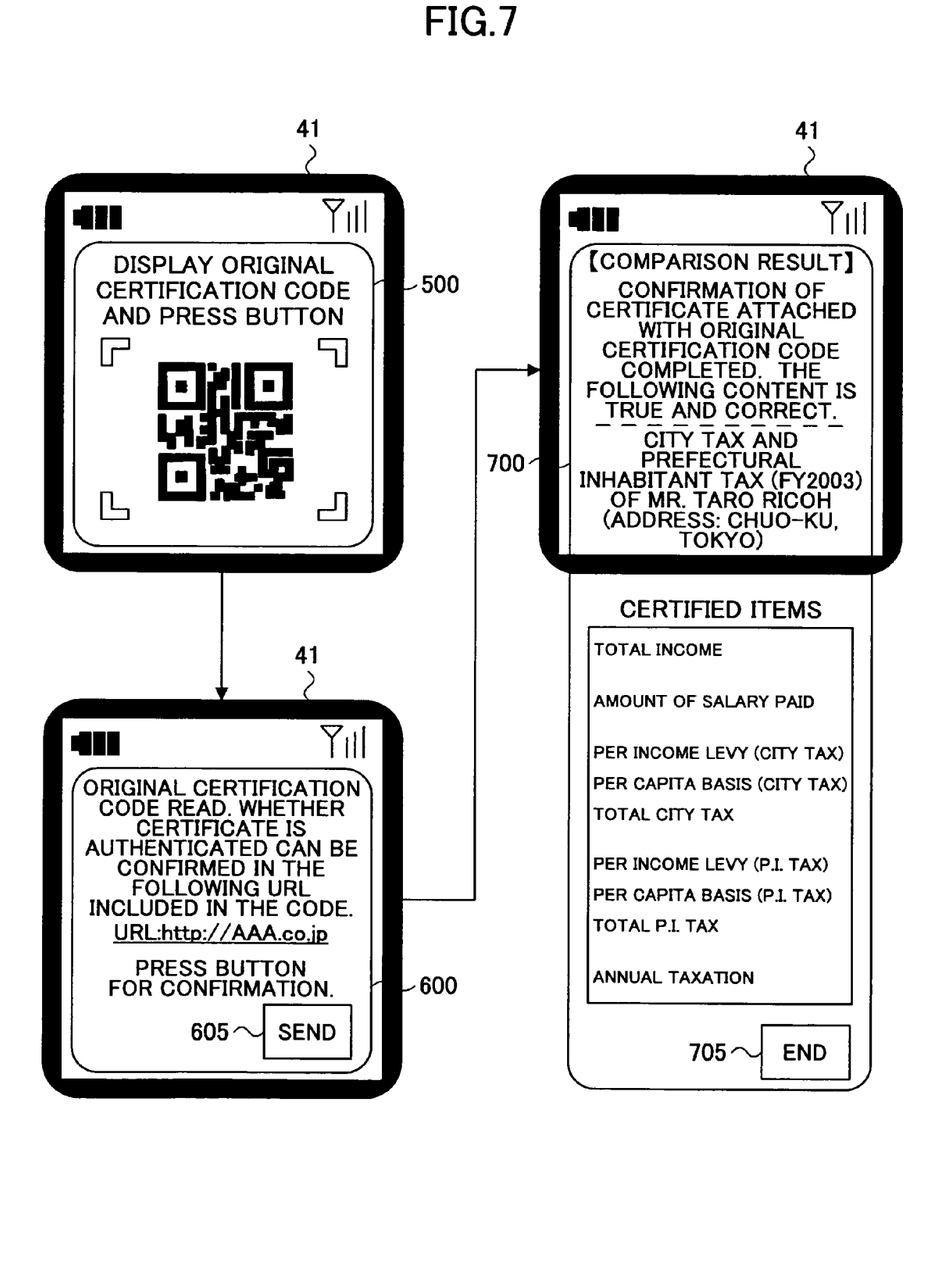
FIG. 7 is a schematic diagram showing screens displayed on a mobile phone terminal in the comparison process.

Referring to FIGS. 6 and 7, a description is given of a comparing process for confirming the authenticity of the certificate P. For example, there may be cases where the user confirms the authenticity of the certificate P and where another user who receives the certificate P confirms the authenticity thereof.

First, when confirming the authenticity of the certificate P, the certification code certification code 101 is read in step S2-1 with the use of the mobile phone terminal 40. Specifically, the user presses the function switching button 44 of the mobile phone terminal 40 so as to switch to the two-dimensional code reading mode. Then, the selector button 42 of the mobile phone terminal 40 is pressed with the entire certification code 101 being displayed on the display part 41 as shown in an obtaining screen 500 of FIG. 7. In the aforementioned manner, the mobile phone terminal 40 photographs the certification code 101.

In step S2-2, the mobile phone terminal 40 performs conversion on the photographed certification code 101. Specifically, the mobile phone terminal 40 performs conversion on the certification code 101, thereby obtaining data related to the issuance identifier, hash value, date of creation, and URL. On this occasion, the mobile phone terminal 40 displays, on the display part 41, an information obtaining screen 600 shown in FIG. 7. The information obtaining screen 600 includes the obtained issuance identifier and URL, and a send button 605. In addition, the information obtaining screen 600 includes a message prompting the user to press the send button 605.

Here, the user confirms that the displayed URL is that of a city office issuing the certificate P, and thereafter presses the send button 605 with the use of the selector button 42. Consequently, in step S2-3, the mobile phone terminal 40 transmits comparison data to the certification management system 20. On this occasion, the mobile phone terminal 40 establishes connection to the certification management system 20 based on the URL data obtained from the certification code 101. It should be noted that the transmitted comparison data include data related to the issuance identifier, hash value, and date of creation included in the certification code 101.

In step S2-4, the certification management system 20 performs comparison. Specifically, the management computer 21 of the certification management system 20 searches for the issued data 220 including the received issuance identifier. The management computer 21 compares the date of creation of the extracted issued data 220 with the received date of creation. When both dates of creation match, the management computer 21 compares the hash value of the extracted issued data 220 with the received hash value. As a result of the comparison, when the hash value of the issued data 220 matches the received hash value, the management computer 21 obtains data of certified contents in the certified data 230 based on the certification identifier in the issued data 220.

In step S2-5, the management computer 21 transmits the data of certified contents to the mobile phone terminal 40. The data of certified contents include data related to items certified in the issued certificate P and data related to the person whose data are to be certified.

In step S2-6, based on the received data of certified contents, the mobile phone terminal 40 displays the certified contents as a comparison result screen 700 shown in FIG. 7. The comparison result screen 700 includes the items certified in the issued certificate P and simplified information about the person whose data are to be certified. It is possible to confirm the certified contents by comparing the certified contents with the contents of the certificate P.

Further the comparison result screen 700 includes an end button 705. When the user has confirmed the certified contents, the user may press the end button 705. In the aforementioned manner, the comparison process for confirming the authenticity of the certificate P ends.

According to this embodiment, it is possible to obtain the effects as follows.

In this embodiment, when issuing the certificate P, the certification management system 20 records, in the issued data storing part 22, the hash value generated based on the contents to be certified in the certificate P. The certification management system 20 causes the printer 30 to print the certification code 101 including the generated hash value. The mobile phone terminal 40 reads the certification code 101 printed on the certificate P and transmits the hash value included in the certification code 101 to the certification management system 20. The certification management system 20 compares the hash value received from the mobile phone terminal 40 with the hash value generated and recorded in the issued data storing part 22 so as to determine the authenticity of the certificate P. The certification management system 20 transmits information about the authenticity to the mobile phone terminal 40 to which the data including the hash value are transmitted. The mobile phone terminal 40 displays and presents to the user the information about the authenticity. Hence, the user can readily confirm the authenticity of the certificate P based on the information displayed on the mobile phone terminal 40.

In this embodiment, in order to confirm the authenticity of the certificate P, the hash value is transmitted to the certification management system 20. The hash value is a unique numerical value with a large digit number. Thus, it is highly unlikely that the hash value matches a numerical value that is randomly input. Moreover, when the certified contents are modified even if only slightly, the hash value of the modified contents is far different from the hash value before the modification. Hence, it is possible to readily confirm the authenticity of the certificate P.

Additionally, in this embodiment, after reading the certification code 101 and before establishing connection to the mobile phone terminal 40, the URL of the certification management system 20, which performs certification, is displayed on the display part 41. Hence, the user can confirm the connecting destination.

Additionally, in this embodiment, the mobile phone terminal 40 receives, from the certification management system 20, the information about the items certified in the certificate P. Hence, it is possible to more positively confirm the certified contents by comparing the contents of the comparison result screen 700 with the contents of the certificate P.

Additionally, in this embodiment, the management computer 21 transmits, to the mobile phone terminal 40, the data of certified contents including the data related to the items certified in the issued certificate P and the data related to the person whose data are to be certified (step S2-5). The comparison result screen 700 is displayed on the display part 41 of the mobile phone terminal 40. The comparison result screen 700 displays the items certified in the certificate P and the simplified information about the person whose data are to be certified. That is, the comparison result screen 700 does not display a detailed address and/or a detailed amount of money. Hence, it is possible to prevent leakage of the certified contents to a person who obtains the information of the certification code 101 but does not have the certificate P.

Further, it should be noted that the above-mentioned embodiment may be modified as follows.

In the above-mentioned embodiment, the description has been given of the certificate P issued by the city office, which is a public organization. However, the present invention may also be applied to, for example, a ticket of a certain play issued by a ticket agency and a certificate of payment issued by an insurance company for tax withholding.

Additionally, in the above-mentioned embodiment, the mobile phone terminal 40 is used as a confirmation terminal for confirming the authenticity of the certificate P. However, the confirmation terminal is not limited to the mobile phone terminal 40, but may be a scanner having a code reading function, a computer coupled to a code reader, or a multi-functional apparatus having a communication function and a code reading function. In the case of the computer as mentioned above, the computer reads the certification code 101 by the code reading function, transmits comparison data based on the read certification code 101 to the certification management system 20, and obtains the comparison result. In the case of the multi-functional apparatus as mentioned above, the multi-functional apparatus reads the certification code 101, transmits comparison data based on the read certification code 101, and obtains the comparison result. In the aforementioned manner, the user can confirm the authenticity with the use of various terminals.

Additionally, in the above-mentioned embodiment, after the mobile phone terminal 40 reads the certification code 101 and when the user presses the send button 605, the hash value is transmitted to the certification management system 20 so as to confirm the authenticity. However, alternatively, confirmation of authenticity may be automatically performed with respect to the certification management system 20 when the mobile phone terminal 40 reads the certification code 101. Specifically, when the hash value and the address of a URL are obtained by reading the certification code 101, the mobile phone terminal 40 transmits the hash value to the certification management system 20 of the obtained address. The certification management system 20 confirms the authenticity based on the received hash value, and transmits information of the authenticity to the mobile phone terminal 40 that has transmitted the hash value. In the aforementioned manner, the mobile phone terminal 40 can automatically receive, from the certification management system 20, the information of the authenticity of the certificate P by reading the certification code 101.

Additionally, in the above-mentioned embodiment, the certification code 101 includes the URL of the certification management system 20. However, alternatively, the certification code 101 may not include the URL of the certification management system 20. In this case, the user inputs the URL of an organization (the city office in the above-mentioned embodiment) that issues the certificate P. The mobile phone terminal 40 may access the input URL, and may transmit data of, for example, the hash value included in the certification code 101 so as to confirm the authenticity of the certificate P. In this case, the user directly accesses the organization that issues the certificate P. Hence, it is possible to prevent someone from posing as the organization that issues the certificate P.

Additionally, in the above-mentioned embodiment, after performing the comparison based on the certification code 101, the certification management system 20 transmits, to the computer terminal 10, the items certified by the city office. Then, the computer terminal 10 displays the certified items on the display part 41 as the comparison result screen 700. However, alternatively, the certification management system 20 may transmit, to the computer terminal 10, only the authenticity indicated by the comparison result, and the computer terminal 10 may display only the comparison result. Further, the computer terminal 10 may transmit the contents certified in the certificate P to the mobile phone terminal 40.

Additionally, in the above-mentioned embodiment, the paper having the copy-protection watermark is used as a printing medium. However, this is not a limitation, and a paper without a watermark may be used. In this case, when printing the display code or the certified contents on paper, an image or characters that serve as a copy-protection watermark may also be printed thereon. Specifically, for example, an image and/or characters are printed that are hardly recognized with the naked eyes but clearly displayed when printed. Further, in addition to paper, the certificate P to be issued may be printed on a print recording medium other than paper.

Additionally, in the above-mentioned embodiment, the hash function is used as a one-way function. However, alternatively, other one-way functions may be used.

The present invention is not limited to the specifically disclosed embodiments, and variations and modifications may be made without departing from the scope of the present invention.

The present application is based on Japanese Priority Application No. 2004-010922 filed on Jan. 19, 2004, the entire contents of which are hereby incorporated by reference.

What is claimed is:

1. A method of confirming a certificate document by using a management computer that issues the certificate document, the management computer being coupled to an application terminal for applying for issuance of the certificate document and to a confirmation terminal for reading a display code printed on the certificate document, the management computer performing the steps of:
specifying contents to be certified based on an application item received from the application terminal;
issuing the certificate document by calculating a compressed value by substituting data related to the contents to be certified into a one-way function, and by generating print data for printing a display code including the compressed value and the contents to be certified;
recording an issuance history of the certificate document; and
when data of a compressed value are received from the confirmation terminal that reads the display code on the certificate document, notifying the confirmation terminal of authenticity of the certificate document based on a result of comparison between the received compressed value and the compressed value calculated in the step of issuing the certificate document.

2. The method as claimed in claim 1, wherein the step of notifying comprises: transmitting, to the confirmation terminal, at least a part of the contents to be certified.

3. The method as claimed in claim 1, wherein the step of issuing comprises:
issuing the certificate document by printing the display code and the contents to be certified on a print recording medium having a copy-protection pattern that includes at least one of a character and a pattern displayed when the certificate document is copied.

4. The method as claimed in claim 1, wherein the step of issuing comprises:
issuing the certificate document by printing a copy-protection pattern together with the display code and the contents to be certified, the copy-protection pattern including at least one of a character and a pattern displayed when the certificate document is copied.

5. The method as claimed in claim 1, wherein the terminal is a mobile phone terminal, and the mobile phone terminal performs the steps of:
photographing the display code;
obtaining, from the photographed display code, data included in the display code; and
receiving, from the management computer that transmits the data obtained in the step of obtaining, data related to authenticity of the certificate document and displaying the data related to authenticity.

6. The method as claimed in claim 2, wherein the step of issuing comprises:
issuing the certificate document by printing the display code and the contents to be certified on a print recording medium having a copy-protection pattern that includes at least one of a character and a pattern displayed when the certificate document is copied.

7. The method as claimed in claim 6, wherein the terminal is a mobile phone terminal, and the mobile phone terminal performs the steps of:
photographing the display code;
obtaining, from the photographed display code, data included in the display code; and
receiving, from the management computer that transmits the data obtained in the step of obtaining, data related to authenticity of the certificate document and displaying the data related to authenticity.

8. The method as claimed in claim 2, wherein the step of issuing comprises:
issuing the certificate document by printing a copy-protection pattern together with the display code and the contents to be certified, the copy-protection pattern including one of a character and a pattern displayed when the certificate document is copied.

9. The method as claimed in claim 8, wherein the terminal is a mobile phone terminal, and the mobile phone terminal performs the steps of:
photographing the display code;
obtaining, from the photographed display code, data included in the display code; and
receiving, from the management computer that transmits the data obtained in the step of obtaining, data related to authenticity of the certificate document and displaying the data related to authenticity.

10. The method as claimed in claim 1, wherein the terminal is a mobile phone terminal, and the mobile phone terminal performs the steps of:
photographing the display code;
obtaining, from the photographed display code, data included in the display code; and
receiving, from the management computer that transmits the data obtained in the step of obtaining, data related to authenticity of the certificate document and displaying the data related to authenticity.

11. A computer readable information recording medium containing computer program instructions for confirming a certificate document by using a management computer that issues the certificate document, the management computer being coupled to an application terminal for applying for issuance of the certificate document and to a confirmation terminal for reading a display code printed on the certificate document,
the computer readable information recording medium causing the management computer to function as:
specifying means for specifying contents to be certified based on an application item received from the application terminal;
issuing means for issuing the certificate document by calculating a compressed value by substituting data related to the contents to be certified into a one-way function, and by generating print data for printing a display code including the compressed value and the contents to be certified;
recording means for recording an issuance history of the certificate document; and
notifying means for notifying, when data of a compressed value are received from the confirmation terminal that reads the display code on the certificate document, the confirmation terminal of authenticity of the certificate document based on a result of comparison between the received compressed value and the compressed value calculated by the issuing means.

12. The computer readable information recording medium as claimed in claim 11, wherein the notifying means transmits, to the confirmation terminal, at least a part of the contents to be certified.

13. The computer readable information recording medium as claimed in claim 12, wherein the issuing means issues the certificate document by printing the display code and the contents to be certified on a print recording medium having a copy-protection pattern that includes at least one of a character and a pattern displayed when the certificate document is copied.

14. The computer readable information recording medium as claimed in claim 12, wherein the issuing means issues the certificate document by printing a copy-protection pattern together with the display code and the contents to be certified, the copy-protection pattern including at least one of a character and a pattern displayed when the certificate document is copied.

15. The computer readable information recording medium as claimed in claim 11, wherein the issuing means issues the certificate document by printing the display code and the contents to be certified on a print recording medium having a copy-protection pattern that includes al least one of a character and a pattern displayed when the certificate document is copied.

16. The computer readable information recording medium as claimed in claim 11, wherein the issuing means issues the certificate document by printing a copy-protection pattern together with the display code and the contents to be certified, the copy-protection pattern including at least one of a character and a pattern displayed when the certificate document is copied.

17. A certificate document created by a method comprising the steps of:
specifying contents to be certified based on an application item received from an application terminal;
issuing the certificate document by calculating a compressed value by substituting data related to the contents to be certified into a one-way function, and by generating print data for printing a display code including the compressed value and the contents to be certified; and
printing the certificate document based on the print data,
wherein the certificate document is authenticatable by reading the display code of the certificate document and comparing the display code's compressed value with an issuance history of the certificate document.

* * * * *